Patented May 6, 1924.

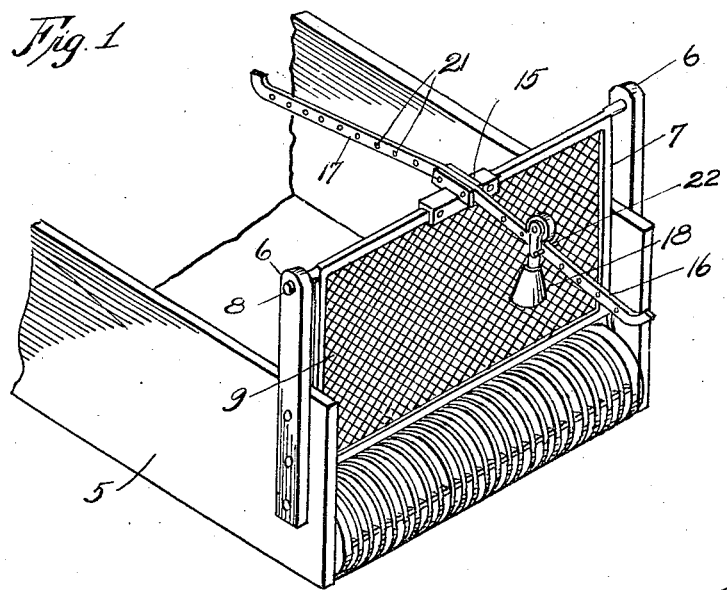
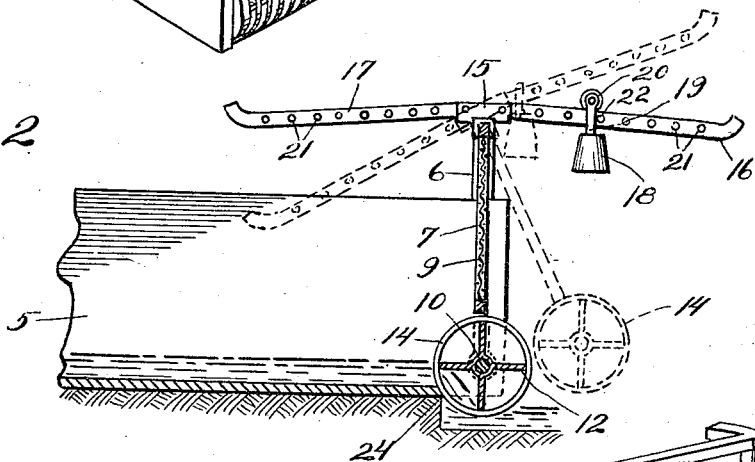
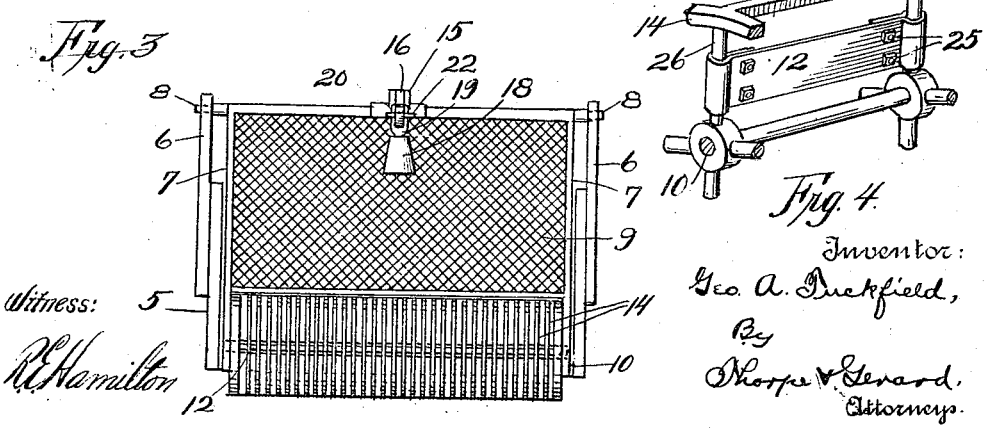

1,493,405

UNITED STATES PATENT OFFICE.

GEORGE A. TUCKFIELD, OF KANSAS CITY, MISSOURI.

FISH-SCREEN GATE.

Application filed January 3, 1921. Serial No. 434,860.

*To all whom it may concern:*

Be it known that I, GEORGE A. TUCK-FIELD, citizen of the United States, and resident of Kansas City, county of Jackson, State of Missouri, have invented a certain new and useful Improvement in Fish-Screen Gates, of which the following is a complete specification.

The present invention relates to fish screens, and aims to provide an improved screen construction adapted for use in running streams for preventing the passage of fish along with the water flow, while at the same time any débris which collects at the screen is allowed to pass along with the current.

Accordingly I have devised an improved construction which comprises a pivoted screen frame having a paddle wheel or roller across its lower margin and rotating with the water current, the screen frame being so pivoted as to swing after a certain head or pressure has been reached, due to the collection of the débris at the base of the screen, and allow said débris to pass out beneath the screen.

With this general object in view, the invention will now be described by reference to the accompanying drawing illustrating one form of construction which I have devised for embodying the proposed improvements, after which the novel features therein will be particularly set forth and claimed.

In the drawing:—

Figure 1 is a perspective view illustrating a portion of a flume, provided with a fish screen gate constructed in accordance with the present invention;

Figure 2 is a longitudinal sectional elevation of the same;

Figure 3 is an end view of the apparatus;

Figure 4 is a detail perspective view, illustrating an adjustable paddle construction.

Referring now in detail to the drawing, this illustrates the improved fish screen gate in relation to a flume 5, such as is employed for diverting water from a main stream, either for irrigation or power purposes. At one point in this flume, as at the mouth thereof, I provide a pair of uprights 6, to the upper ends of which is pivotally connected a swinging screen frame 7, having the trunnion elements 8 journaled in the upper ends of the upright members 6. The screen frame 7 is adapted for the support of a screen panel 9 extending across the passage within the flume 5, in addition to which the sides of the frame 7 are extended downwardly for the purpose of journaling a shaft 10 which carries a roller or wheel made up of a series of paddle elements 12 alternating with a series of ring members 14. The paddle wheel is thus adapted to rotate beneath the screen panel 9 under the action of the water flow, for allowing the passage of any light débris without involving any swinging movement of the screen frame 7.

The upper edge of the screen frame 7 is provided with a bracket 15 for securing to said frame a pair of arms 16, 17, the arm 16 projecting forwardly and downwardly, while the other arm 17 is inclined rearwardly from the top of the frame 7, as clearly illustrated in Figures 1 and 2. These arms are designed for the support of a counterweight member 18 having a hanger 19 for journaling a roller 20, whereby the counterweight 18 is adapted for rolling travel along either of the arms 16 and 17, each of which is provided with a series of openings 21 for receiving a stop pin 22 for appropriately limiting the outward travel of the weight 18. When carried by the arm 16, the counterweight 18 is adapted for maintaining the screen frame 7 normally in substantial vertical position at the mouth of the flume; by suitably varying the position of the weight along the arm 16, it is apparent that the leverage exerted thereby upon the screen frame may be regulated for varying the amount of pressure required to force the screen frame 7 outwardly into the position represented by the broken lines in Figure 2. This is for the purpose of varying the extent to which the débris is permitted to accumulate at the rear of the screen before the latter is allowed to open for permitting the passage of the débris out beneath the paddle wheel.

In Figure 2 of the drawing, the weight 18 is positioned upon the forwardly extended arm 16, so that the weight thereof operates to hold the screen and the paddle wheel in substantially vertical position with the wheel opposite the ledge 24 formed in the bottom of the flume passage adjacent the paddle wheel.

It will be understood that any light dé- bris such as leaves or other small articles will simply be carried along with the water flow without any material opposition, but that larger débris such as logs, branches and trees, or other matter which will not readily pass through the restricted space around the bottom of the device, will simply collect until a sufficient water head or pressure is exerted for forcing the screen gate to swing outward, whereupon all the débris will be swept out of the mouth of the flume during the momentary opening of the screen gate, which immediately drops back into its normal position. In this operation the arm 16 moves from forwardly inclined position into a rearwardly inclined position, which causes the weight to gravitate down the incline into the position shown in Figure 2, thereby resulting in a freer swinging movement of the gate after the action of the counterweight has once been overcome. In the event that a still freer swinging action of the gate is desired, it will be understood that the weight is simply transferred to the rear arm 17, in which position the weight simply operates to increase the tendency of the gate to swing open, in response to a relatively smaller pressure due to the collection of débris. In case the weight is used upon arm 17, its effective action will be regulated by simply adjusting the position of the stop pin 22, with the result that the swinging tendency of the swing gate is correspondingly varied.

In Figure 4, 1 illustrates a modified form of construction of the paddle wheel, in which the paddle or blade elements 12 are adjustably secured upon the spokes 26 of the wheel, by means of clamping bolts 25, for the purpose of adjusting the action of the wheel, simply by varying the position of said paddles or blades 12 with reference to the axis 10 of the wheel.

From the foregoing it will be apparent that I have devised a comparatively simple and efficient construction for carrying out the desired object of the invention, of preventing the fish from going down with the current of the stream, while at the same time, allowing of the débris to pass a given point. While I have illustrated and described what I now regard as the preferred form of construction, I desire to reserve the right to make all changes or modifications which will fall within the scope of the following claims.

What I claim is:

1. A fish screen gate comprising a pivotally mounted frame, a screen panel carried by said frame, and a paddle wheel journaled in said frame beneath said panel.

2. A fish screen gate comprising a pivotally mounted frame, a screen panel carried by said frame, and a paddle wheel provided with adjustable paddle elements and journaled in said frame beneath said panel.

3. A fish screen gate comprising a frame pivotally mounted for swinging movement about a horizontal axis coinciding with the upper edge portion of said frame, an arm rigid with said frame and projecting laterally from the upper margin thereof, and a weight adapted for rolling travel along said arm for automatically varying the leverage of said weight in the different positions of said arm.

4. A fish screen gate comprising a frame pivotally mounted for swinging movement about a horizontal axis coinciding with the upper edge portion of said frame, an arm rigid with said frame and projecting laterally from the upper margin thereof, a weight adapted for rolling travel along said arm for automatically varying the leverage of said weight in the different positions of said arm, and an adjustable stop device for limiting the outward travel of said weight.

5. A fish screen gate comprising a pivotally mounted frame, a screen panel carried by said frame, a downwardly inclined arm carried by said frame, and a weight adapted to travel along said arm to automatically vary the leverage of the weight during the swinging of said arm.

6. A fish screen gate comprising a pivotally mounted frame, a screen panel carried by said frame, a pair of arms projecting in opposite directions from the opposite faces of said frame, and a weight adapted to be associated with either of said arms to vary the swinging tendency of said frame.

In witness whereof I affix my signature.

GEORGE A. TUCKFIELD.